United States Patent [19]

Umebayashi et al.

[11] Patent Number: 5,319,507
[45] Date of Patent: Jun. 7, 1994

[54] RECORDING/REPRODUCING SYSTEM USING A FLEXIBLE MAGNETIC DISK

[75] Inventors: Nobuhiro Umebayashi, Tsukuba; Kazuya Fukunaga, Ibaraki; Mikio Kishimoto, Ibaraki; Norio Ohta, Ibaraki, all of Japan

[73] Assignee: Hitachi Maxell, Ltd., Osaka, Japan

[21] Appl. No.: 857,833

[22] Filed: Mar. 26, 1992

[30] Foreign Application Priority Data

Mar. 27, 1991 [JP] Japan ................................. 3-85871

[51] Int. Cl.⁵ .............................................. G11B 5/596
[52] U.S. Cl. ........................... 360/77.03; 360/77.07; 360/135; 369/44.26
[58] Field of Search ............... 360/77.03, 77.07, 135; 369/44.26

[56] References Cited

U.S. PATENT DOCUMENTS

| | | | |
|---|---|---|---|
| 4,875,116 | 10/1989 | Yasuda et al. | 360/77.03 |
| 4,958,245 | 9/1990 | Roth et al. | 360/77.03 |
| 4,961,123 | 10/1990 | Williams et al. | |
| 4,987,505 | 1/1991 | Iwabuchi et al. | 360/77.03 |
| 5,091,808 | 2/1992 | Nigam | 360/77.03 |
| 5,148,420 | 9/1992 | Yamamuro | 360/77.03 |
| 5,182,693 | 1/1993 | Koga et al. | 360/135 |

FOREIGN PATENT DOCUMENTS

1039617 2/1989 Japan ................................. 360/77.03

Primary Examiner—Thomas E. Denion
Attorney, Agent, or Firm—Birch, Stewart, Kolasch & Birch

[57] ABSTRACT

A magnetic recording/reproducing apparatus and method, the apparatus including a drive mechanism for driving a flexible magnetic disk loaded thereon to rotate, the magnetic disk being comprised of a transparent and flexible base film formed with first and second magnetic layers on both sides thereof, each of the magnetic layers having a film thickness of no greater than 1 μm, surface of the first magnetic layer being flat, the outer surface of the second magnetic layer on the side away from the first magnetic layer, being provided with recesses for tracking servocontrol extending in the direction of rotation of the magnetic disk; a light emitting element for tracking servocontrol arranged on the side of the magnetic disk facing the first magnetic layer; and a light receiving element for receiving a light beam for tracking servocontrol, the light beam having passed through at least the first magnetic layer, the base film and the second magnetic layer after being emitted from the light emitting element, whereby using the light that has passed through the magnetic disk, proper tracking servocontrol is realized with high reliability, while improving an overwrite characteristic and undergoing less noise.

10 Claims, 6 Drawing Sheets

PRIOR ART

FIG. 19

PRIOR ART

RECORDING/REPRODUCING SYSTEM USING A FLEXIBLE MAGNETIC DISK

BACKGROUND OF THE INVENTION

1. FIELD OF THE INVENTION

The present invention relates to a recording/reproducing apparatus using a flexible magnetic disk and a recording/reproducing method using the magnetic disk, and more particularly to the tracking of a magnetic head unit.

2. DESCRIPTION OF THE RELATED ART

Heretofore, there has been proposed a magnetic disk having grooves formed in a magnetic layer for the purpose of tracking servocontrol, a recording/reproducing apparatus using such a magnetic disk, and so forth (see, by way of example, U.S. Pat. No. 4,958,245 and U.S. Pat. No. 4,961,123).

Figure 18:
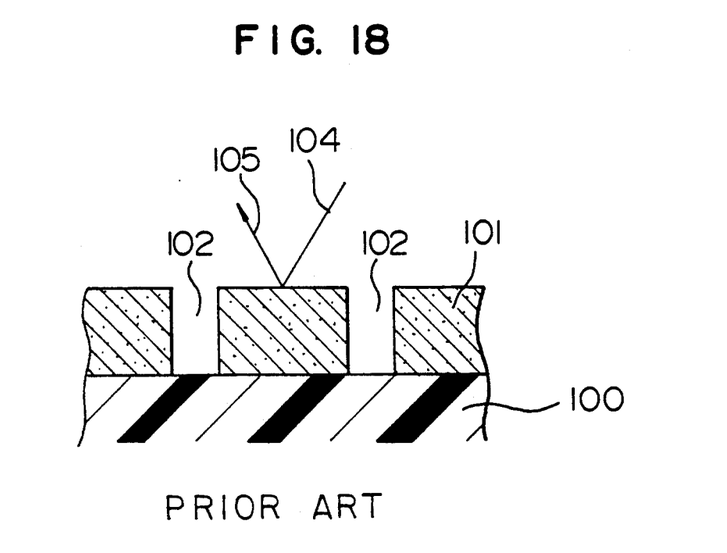
FIG. 18 is an enlarged sectional view of a magnetic disk proposed in the prior art.
Figure 19:
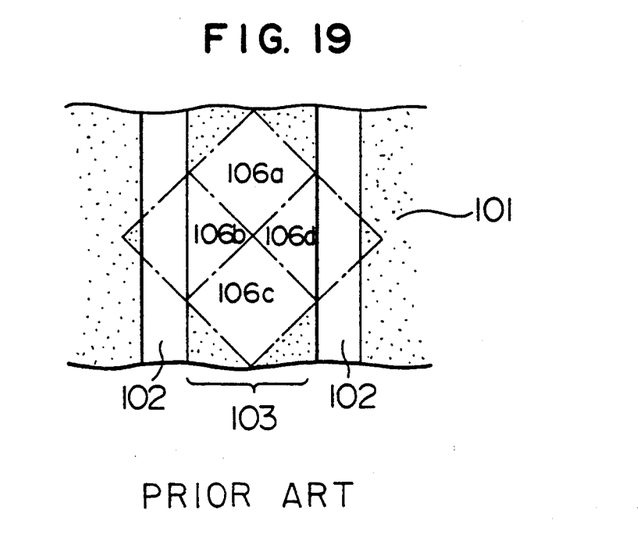
FIG. 19 is a plan view of the magnetic disk in the prior art.

FIGS. 18 and 19 are enlarged sectional and plan views of a magnetic disk, respectively, for explaining the above type magnetic disk.

As shown in these drawings, a magnetic layer 101 is provided on the surface of a base film 100 formed of polyethylene telephthalate (PET), for instance, and grooves 102 for tracking servocontrol are formed by suitable means, e.g., laser machining, to extend in the direction of rotation of the magnetic disk. With that arrangement, the area between one groove 102 and the other groove 102 serves as a recording track 103 (see FIG. 19).

On the other hand, a recording/reproducing apparatus includes a light emitting element (not shown) for emitting a light beam 104 for tracking servocontrol to the surface of the magnetic disk, and light receiving elements 106a, 106b, 106c, 106d (see FIG. 19) for receiving reflected light 105 from the magnetic disk surface.

Thus, the light beam 104 emitted from the light emitting element is irradiated to the magnetic disk surface and the reflected light 105 therefrom is received by the light receiving elements 106a, 106b, 106c, 106d.

With the grooves 102 for tracking servocontrol formed in the magnetic layer 101 as mentioned above, the intensity of the light reflected by the recording track 103 is different from that of the light reflected by the groove 102. In the example shown in FIG. 19, since the light receiving elements 106b and 106d are arranged to receive respective beams of the reflected light from both of the grooves 102, tracking servocontrol for a magnetic head (not shown) is performed by comparing output values of the light receiving elements 106b and 106d and then making an adjustment so that both the output values become equal to each other.

Because of the conventional magnetic disk having the magnetic layer 101 thicker than 2.5 μm, the reflected light 105 from the magnetic layer 101 can be received by the light receiving elements 106a, 106b, 106c, 106d with satisfactory results by integrating the light emitting element and the light receiving elements 106a, 106b, 106c, 106d into a unitary structure.

Meanwhile, in the art of the above type magnetic disk, the thickness of the magnetic layer has a tendency to become thinner for improved overwrite characteristics. Also, the base film being used is usually transparent. Accordingly, when a magnetic disk having a very thin magnetic layer is employed under tracking servocontrol, part or most of the light emitted toward the magnetic layer passes through both the magnetic layer and the base film. Therefore, the intensity of the reflected light becomes so weak that the tracking servocontrol cannot be performed in a proper manner, which leads to a problem in reliability. In view of the above, it would seem that the use of light receiving elements of the highest sensitivity would be able to detect even the reflected light of the weakest intensity, but this is not preferable due to the increasing cost involved.

SUMMARY OF THE INVENTION

An object of the present invention is to solve the disadvantage in the prior art as set forth above, and provide a recording/reproducing apparatus using a flexible magnetic disk and a recording/reproducing method using the magnetic disk, with which an overwrite characteristic can be improved and tracking servocontrol can be performed in a proper manner, while ensuring high reliability.

To achieve the above object, a magnetic recording/reproducing apparatus according to one preferred embodiment of the present invention comprises a drive means for driving a flexible magnetic disk loaded thereon to rotate, the magnetic disk being comprised of a transparent and flexible base film formed with first and second magnetic layers on both sides thereof, each of the magnetic layers having a film thickness restricted to be not greater than 1 μm, one surface of the first magnetic layer being formed to be flat, the outer surface of the second magnetic layer, on the side away from the first magnetic layer, being provided with concentrical or spiral recesses for tracking servocontrol extending in the direction of rotation of the magnetic disk; a light emitting element for tracking servocontrol arranged on the side facing the first magnetic layer; and a light receiving element for receiving a light beam for tracking servocontrol, the light beam having passed through at least the first magnetic layer, the base film and the second magnetic layer after being emitted from the light emitting element.

Also to achieve the above object, a magnetic recording/reproducing method according to one preferred embodiment of the present invention comprises the steps of loading a flexible magnetic disk on drive means of a recording/reproducing apparatus, the magnetic disk being comprised of a transparent and flexible base film formed with first and second magnetic layers on both sides thereof, each of the magnetic layers having a film thickness restricted to be not greater than 1 μm, one surface of the first magnetic layer being formed to be flat, the outer surface of the second magnetic layer, on the side away from the first magnetic layer, being provided with recesses for tracking servocontrol extending in the direction of rotation of the magnetic disk; arranging a light emitting element for tracking servocontrol on the side of the disk facing the first magnetic layer; arranging a light receiving element on the side of the disk facing the second magnetic layer; and causing the light receiving element to receive a light beam having passed through the magnetic disk after being emitted from said light emitting element, to thereby perform tracking servocontrol of a magnetic head unit.

With the present invention as arranged above, the film thickness of the magnetic layer is restricted to be not greater than 1 μm, making it possible to improve an overwrite characteristic of the magnetic disk and thus obtain the magnetic disk undergoing less noise.

Further, with the light receiving element provided near the outer surface of the second magnetic layer, proper tracking servocontrol can be realized with the improved reliability using the light that has passed through the magnetic disk.

DETAILED DESCRIPTION

Figure 1:
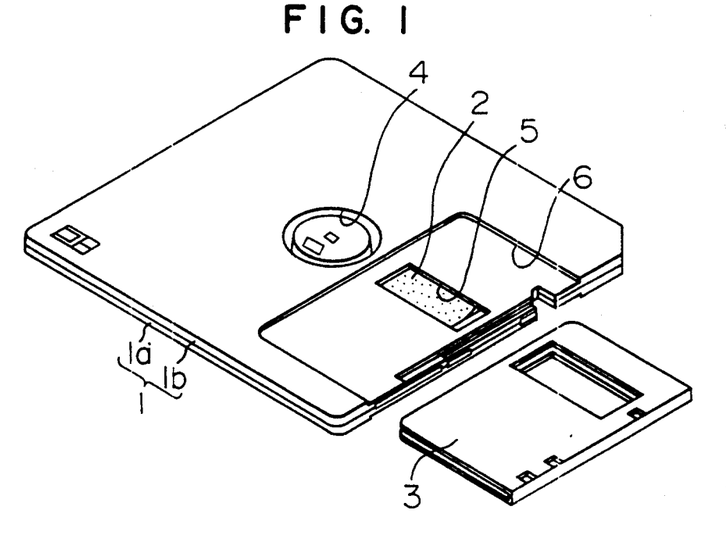
FIG. 1 is a perspective view of a magnetic disk cartridge, partly disassembled, according to one embodiment of the present invention.
Figure 2:
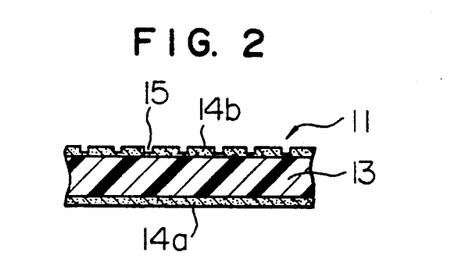
FIG. 2 is an enlarged sectional view of a magnetic disk for use in the magnetic disk cartridge of FIG. 1.
Figure 3:
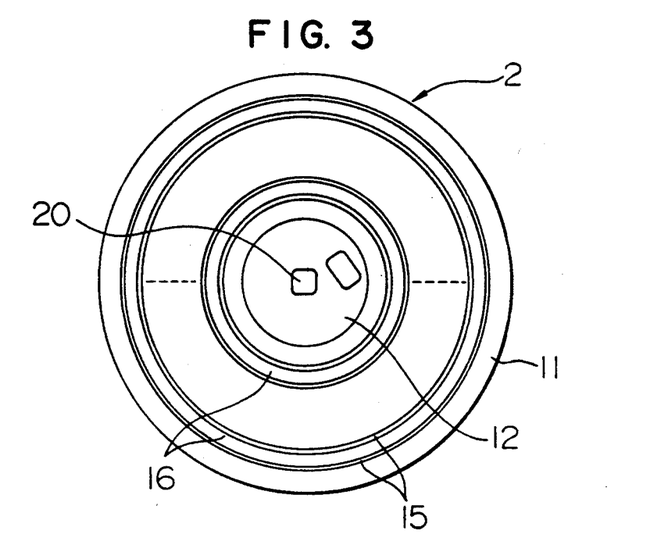
FIG. 3 is a plan view of the magnetic disk for use in the magnetic disk cartridge of FIG. 1.
Figure 4:
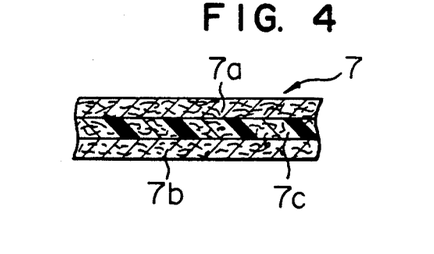
FIG. 4 is an enlarged sectional view of a cleaning sheet for use in the magnetic disk cartridge of FIG. 1.
Figure 5:
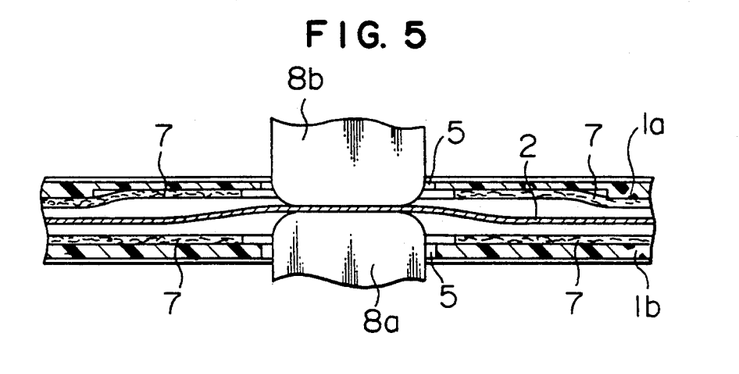
FIG. 5 is an enlarged sectional view in the vicinity of a magnetic head insertion opening, the view showing a state of the magnetic disk cartridge of FIG. 1 in use.
Figure 6:
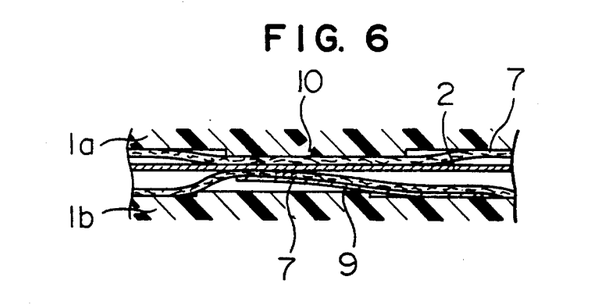
FIG. 6 is an enlarged sectional view in the vicinity of an elastic piece of the magnetic disk cartridge of FIG. 1.

Hereinafter, preferred embodiments of the present invention will be described with reference to the drawings. FIG. 1 is a perspective view of a magnetic disk cartridge, partly disassembled, according to one embodiment, FIG. 2 is an enlarged sectional view of a magnetic disk or sheet, FIG. 3 is a plan view of the magnetic disk, FIG. 4 is an enlarged sectional view of a cleaning sheet, FIG. 5 is an enlarged sectional view in the vicinity of a magnetic head insertion opening, the view showing a state of the magnetic disk cartridge of FIG. 1 in use, and FIG. 6 is an enlarged sectional view in the vicinity of an elastic piece of the magnetic disk cartridge of FIG. 1.

As shown in FIG. 1, the magnetic disk cartridge mainly comprises a cartridge case 1, a flexible magnetic disk 2 rotatably accommodated in the cartridge case 1, and a shutter 3 slidably supported to the cartridge case 1.

The cartridge case 1 comprises an upper case 1a a lower case 1b each of which is injection-molded using hard synthetic resins such as ABS resin.

The lower case 1b is formed with an opening 4, into which a rotary drive shaft is to be inserted, substantially at the center thereof and with a rectangular head insertion opening 5 located in the vicinity of the opening 4. The upper case 1a also has a head insertion opening 5 similarly provided therein (see FIG. 5). Near and along the front sides of the upper case 1a and the lower case 1b, as shown in FIG. 1, there are formed recesses 6 slightly depressed from the remaining surfaces to restrict a slidable range of the shutter 3, with the head insertion openings 5 provided at middle positions of the recesses 6.

As shown in FIGS. 5 and 6, a cleaning sheet 7 is stuck to each inner surface of the upper case 1a and the lower case 1b by suitable means, e.g., ultrasonic fusion. The cleaning sheet 7 comprises, as shown in FIG. 4, a disk-side non-woven cloth layer 7a held in contact with the magnetic disk 2, a case-side non-woven cloth layer 7b held in contact with the cartridge case 1, and an intermediate non-woven cloth layer 7c for interconnecting the disk-side non-woven cloth layer 7a and the case-side non woven cloth layer 7b.

The disk-side non-woven cloth layer 7a and the case-side non-woven cloth layer 7b are both formed of rayon fibers alone in such a manner that the inside and the outside of each layer cannot be discriminated one from the other. The intermediate non-woven cloth layer 7c comprises a mixed layer consisting of rayon fibers and thermoplastic fibers. As the thermoplastic fibers, use is made of, for instance, polyamide, polyethylene telephthalate, polyethylene, polypropylene, polystyrene, polyvinyl chloride and acrylic fibers.

In addition, non-woven cloth made of acrylic fibers or polyester fibers may also be used, as the non-woven cloth layers 7a, and 7b, either alone or in the mixed form thereof or with rayon fibers.

During use of the magnetic disk cartridge, as shown in FIG. 5, a first magnetic head unit 8a including a head core adapted to perform magnetic read/write and a slider adapted to make the head core stably contacted with the magnetic disk, and a second magnetic head unit 8a including a head core and a slider, as with the first magnetic head unit 8a, are inserted through the respective head insertion openings 5, 5. The magnetic disk 2 is rotated while being held between both the magnetic head units 8a and 8b, so that read/write of the signals are performed by both of the magnetic head units 8a and 8b. Note that the magnetic head unit to be used in the present invention does not necessarily require the above-mentioned slider and may comprise only the head core kept in a predetermined configuration.

As shown in FIG. 6, an elastic piece 9 formed by bending a plastic sheet of polyester or the like is attached in an inclined state to the inner surface of the lower case 1b. On the other hand, a protrusion 10 is formed on the inner surface of the upper case 1a at a position facing the elastic piece 9. Therefore, the lower cleaning sheet 7 is partly raised up by the elastic piece 9 and this rise is slightly pushed down by the protrusion 10 on the side of the upper case 1a, so that the magnetic disk 2 is elastically held between the upper and lower cleaning sheets 7, 7. As the magnetic disk 2 rotates, the disk surfaces are cleaned by the cleaning sheets 7, 7.

Construction of the magnetic disk 2 will be next explained. As shown in FIG. 3, the magnetic disk 2 comprises a flexible magnetic sheet 11 in the form of a disk and a center hub 12 inserted into the center hole of the magnetic sheet 11.

The magnetic sheet 11 comprises, as shown in FIG. 2, a base film 13 formed of a transparent polyester film or the like and magnetic layers 14a, and 14b coated on both sides of the base film 13.

As the base film 13, there can be used a synthetic resin film made of, for instance, polyethylene telephthalate (PET), polyethylene naphthalate (PEN) or polyimide.

The magnetic layers 14a and 14b are formed of a mixture of ferromagnetic powder, binder, lubricant, reinforcing powder and so forth.

As the ferromagnetic powder, use is made of, for instance, α-Fe, barium ferrite, Co-Ni and Co-P.

As the binder, use is made of, for instance, a vinyl chloride-vinyl acetate copolymer, a vinyl chloride-vinyl acetate-vinyl alcohol copolymer, urethane resin and polyisocyanate compound.

As the lubricant, use is made of, for instance, a higher fatty acid such as stearic acid or oleic acid, ester of the higher fatty acid, liquid paraffin, squalene and fluoric resin. Note that the percentage of addition of the lubricant is appropriately in a range of 1 to 25 wt. % for the ferromagnetic power.

As the reinforcing power, use is made of, for instance, aluminum oxide, chromium oxide, silicon carbide and silicone nitride. Note that the percentage of addition of the reinforcing powder is appropriately in a range of 0.1 to 25 wt. % for the ferromagnetic power.

Practical composition examples of a magnetic coating material are given below.

| Composition Example 1 of Magnetic Coating Material | |
|---|---|
| α-Fe (Hc: 16500 e, amount of saturated magnetization: 136 emu/g, mean semimajor axis: 0.25 μm, mean axis ratio: 8) | 100 weight parts |
| vinyl chloride-vinyl acetate-vinyl alcohol copolymer | 14.1 weight parts |
| urethane resin | 8.5 weight parts |
| 3-functional isocyanate compound | 5.6 weight parts |
| alumina powder (mean grain size: 0.43 μm) | 20 weight parts |
| carbon black | 2 weight parts |
| oleil oleat | 7 weight parts |
| cyclohexane | 150 weight parts |
| toluene | 150 weight parts |
| Composition Example 2 of Magnetic Coating Material | |
| barium ferrite (Hc: 5300 e, amount of saturated magnetization: 57 emu/g, mean grain size: 0.04 μm) | 100 weight parts |
| vinyl chloride-vinyl acetate-vinyl alcohol copolymer | 11.0 weight parts |
| urethane resin | 6.6 weight parts |
| 3-functional isocyanate compound | 4.4 weight parts |
| alumina powder (mean grain size: 0.43 μm) | 15 weight parts |
| carbon black | 2 weight parts |
| oleil oleat | 7 weight parts |
| cyclohexane | 150 weight parts |
| toluene | 150 weight parts |

The component of the above Composition Examples 1 or 2 of Magnetic Coating Material are thoroughly mixed and dispersed in a ball mill to prepare a magnetic coating material. This magnetic coating material is coated on both the surfaces of the base film, which is 75 μm thick and made of polyethylene telephthalate (PET), to become 0.7 μm in dry thickness and, after drying, subjected to calendering to form each magnetic layer 14 with surface roughness Ra (0.08 mm cut-off) being not greater than 0.01 μm.

Figure 7:
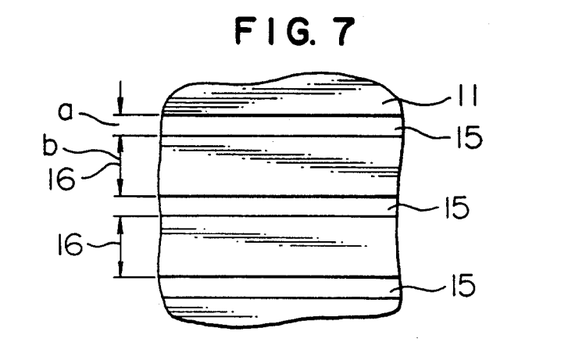
FIG. 7 is a partial enlarged plan view of the magnetic disk for use in the magnetic disk cartridge of FIG. 1.
Figure 8:
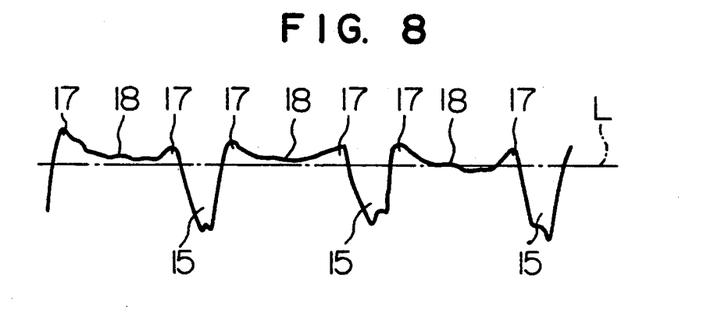
FIG. 8 is a chart showing a surface condition of the magnetic disk.

On the surface of the second magnetic layer 14b of the magnetic disk 2 thus fabricated, a number of continuous or dicontinuous groove-like recesses 15 for tracking servocontrol are formed concentrically by embossing, for example, with a width of a 5 μm and spacings corresponding to a track width=b (e.g., 15 μm). The entire pattern of the recesses 15 is formed, by way of example, into a concentrical shape about the center of rotation of the magnetic disk 2 as shown in FIG. 3, and the area between one recess 15 and another recess 15 adjacent to each other serves as an effective recording track portion 16 as shown in FIGS. 3, 7 and 8. The recesses 15 are formed through compression by a stamper as explained later. More specifically, as shown in FIG. 8, with formation of a recesses 15 having substantially an inverted-trapezoidal shape in cross-section, the surrounding regions of each recess are heaved up to form projections 17, having substantially a mountain-like shape in cross-section, on both sides of the recording track portion 16 in a continuous or discontinuous state. Further, between the projections 17, 17 adjacent to each other, a low portion 18 is formed to be relatively lower than the projections 17 (but shallower or higher than the recesses 15) and is located in an exactly opposite relation to a magnetic gap (not shown) of the magnetic head unit.

FIG. 8 is a chart showing a surface condition of the second magnetic layer 14b as measured by using a surface roughness gauge. As will be seen from the chart, although the projections 17 are not always constant in their configuration and height from one to another, each projection is entirely mountain-like in cross-section and the low portions 18 are formed almost at the same level.

When a reference line L is drawn to pass the respective bottom surfaces of the low portions 18 as shown in FIG. 8, it is appropriate that the mean depth of the recesses 15 from the reference line L is in a range of 0.01 to 0.5 μm (about 0.15 μm in this embodiment), the mean height of the projections 17 is in a range of 0.01 to 0.1 μm (about 0.05 μm in this embodiment), and the mean step difference from the bottom surfaces of the low portions 18 to the top tips of the projections 17 is in a range of 0.01 to 0.1 μm (about 0.05 μm in this embodiment).

Figure 9:
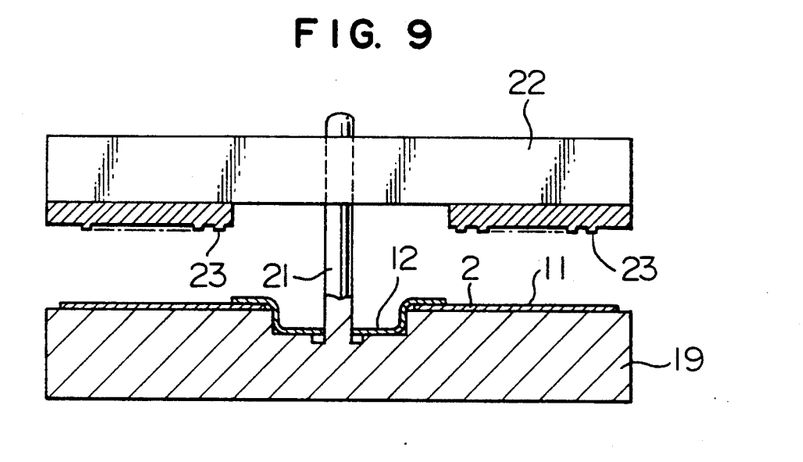
FIG. 9 is a view for explaining the step of machining grooves in the magnetic disk.

FIG. 9 is a view for explaining the step of forming the recesses 15. The magnetic disk 2 having a center hub 12 attached thereto is set on a base 19. The base 19 is provided with a guide pin 21 vertically projecting from the base 19 and inserted through a center hole 20 (see FIG. 3) of the center hub 12. By resting the magnetic disk 2 on the base 19 such that the guide pin 21 passes through the center hole 20 of the center hub 12, the magnetic disk 2 is property positioned on the base 19.

Above the base 19, there is arranged a stamper 22 parallel to the base 19 in a vertically movable manner. The vertical movement of the stamper 22 is guided by the guide pin 21 of the base 19. The stamper 22 has a number of fine projections 23 provided concentrically so as to form the recesses 15.

By descending the stamper 22 from the state of FIG. 9, the magnetic sheet 11 of the magnetic disk 2 is held between the base 19 and the stamper 22 under a predetermined pressure. This forces the projections 23 provided on the stamper 22 to bite into the surface of the second magnetic layer 14b for compression, whereby the recesses 15 having substantially an inverted-trapezoidal shape in cross-section and, at the same time, parts of the magnetic layer 14 are pushed aside to form the projections 17, as shown in FIG. 8.

The projections 17 thus formed have higher loading rates of the magnetic powder, the reinforcing powder and the binder than those of the low portions 18 in their magnetic layers, resulting in the structure which has high mechanical strength and exhibits less wear.

Figure 10:
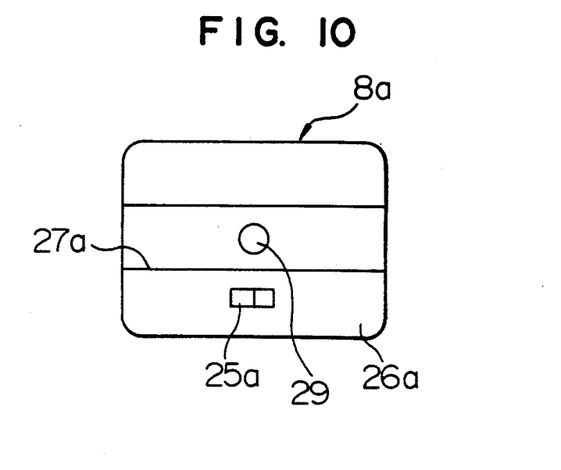
FIG. 10 is a plan view of a first magnetic head unit according to a first embodiment.

FIG. 10 is a plan view of a first magnetic head unit 8a according to a first embodiment for use in the present invention. As shown in FIG. 10, the magnetic head unit 8a compress a magnetic core 25a formed of a magnetic material such as Mo-Ni-Fe alloy, Al-Si-Fe alloy, Ni-Zn ferrite or amorphous alloy, and a slider 26a formed of a non-magnetic material, such as barium titanate, for holding the magnetic core 25a. An air-vent groove 27a is defined in the upper surface of the slider 26a facing the magnetic disk 2 to extend thoroughly, and a light emitting element 29 is integrally attached to almost a central position of the groove 27a.

Figure 11:
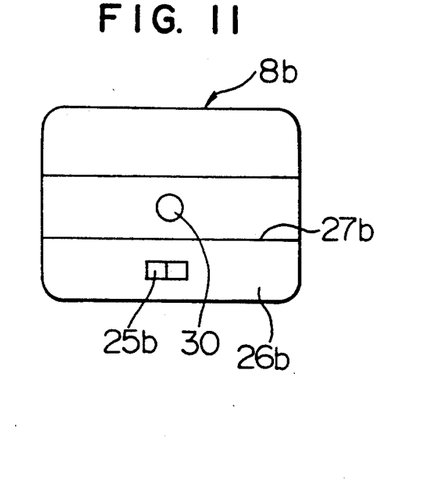
FIG. 11 is a bottom view of a second magnetic head unit according to the first embodiment.

FIG. 11 is a bottom view of a second magnetic head unit 8b according to the first embodiment for use in the present invention. Likewise, the magnetic head unit 8b comprises a magnetic core 25b formed of a magnetic material such as Mo-Ni-Fe alloy, Al-Si-Fe alloy, Ni-Zn ferrite or amorphous alloy, and a slider 26b formed of a non-magnetic material, such as barium titanate, for holding the magnetic core 25b. An air-vent groove 27b is defined in the lower surface of the slider 26b facing the magnetic disk 2 to extend thoroughly, and a light receiving element 30 is integrally attached to almost a central position of the groove 27a, i.e., a position opposite to the light emitting element 29.

Note that the light emitting element 29 and the light receiving element 30 are not necessarily attached to the central portions of the sliders 26a, 26b, and may be integrally attached to the outer peripheral portions of the sliders 26a, 26b, for example, upstream of the sliders 26a, 26b in the direction of rotation of the magnetic disk.

Figure 12:
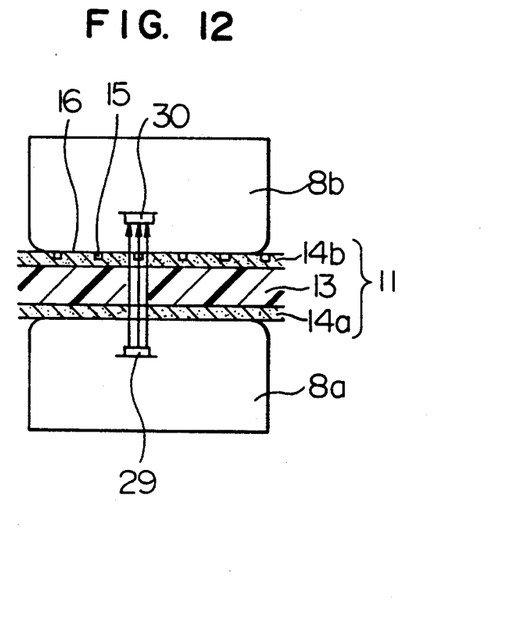
FIG. 12 is a view for explaining tracking servocontrol of a magnetic head according to the first embodiment.
Figure 13:
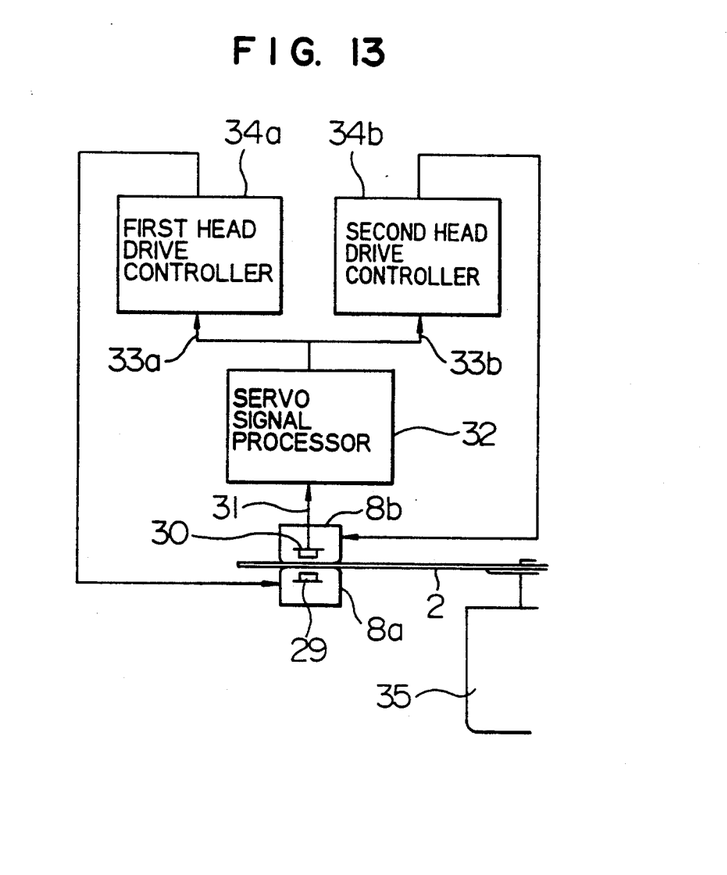
FIG. 13 is a block diagram for explaining tracking servocontrol of the magnetic head according to the first embodiment.

FIGS. 12 and 13 are views for explaining tracking servocontrol of the magnetic disk 2 according to the first embodiment. As shown in these drawings, the light emitting element 29 comprising an LED, for example, which emits a light beam for tracking servocontrol, is integrally attached to the first magnetic head unit 8a located to face the first magnetic layer 14a of the magnetic disk 2. Also, the light receiving element 30 (in fact, comprising a plurality of detection elements as shown in FIG. 19) is integrally attached to the second magnetic head unit 8b located to face the second magnetic layer 14b of the magnetic disk 2. Note that the portions of the magnetic head units 8a, 8b to which the light emitting element 29 and the light receiving element 30 are attached, respectively, are made open toward the magnetic disk 2.

The light from the light emitting element 29 passes through the first magnetic layer 14a having the flat surface and the base film 13, then passes through the recess 15 of the second magnetic layer 14b and parts of the recording track portions 16 on both sides of the recess 15, and is finally received by the light receiving element 30. Because the surface condition of the first magnetic layer 14a is totally flat as mentioned above, the tracking servocontrol will not be adversely affected upon the light passing through the first magnetic layer 14a.

Respective detection signals 31 from the light receiving element 30 are input to a servo signal processor or processing section 32, as shown in FIG. 13, in which the amount of shift of the magnetic head unit 8a (8b) relative to the recording track portion 16, e., the amount of position correction of the magnetic head unit 8a (8b) relative to the recording track portion 16, at the present time is calculated through arithmetic processing.

When the first magnetic head unit 8a, for instance, is now being used to perform any of write, read and erase of information, a position correction control signal 33a obtained from the servo signal processing section 32 is input to a first head drive controller 34a and the tracking control of the first magnetic head unit 8a is carried out in response to the control signal 33a.

On the other hand, when the second magnetic head unit 8b is now being used to perform any of write, read and erase of information, a position correction control signal 33b obtained from the servo signal processing section 32 is input to a second head drive controller 34b and the tracking control of the second magnetic head unit 8b is carried out in response to the control signal 33b. Incidentally, reference numeral 35 in FIG. 13 denotes a drive motor for driving the magnetic disk 2 to rotate.

Magnetic head units of another embodiment (second embodiment) will be next explained.

Figure 14:
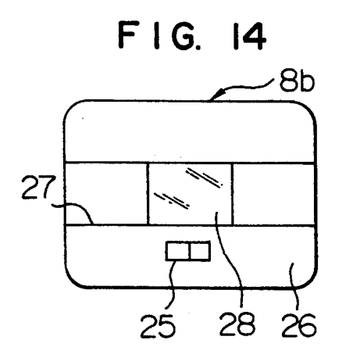
FIG. 14 is a bottom view of a second magnetic head unit according to a second embodiment.

FIG. 14 is a bottom view of a second magnetic head unit 8b according to a second embodiment for use in the present invention. As shown in FIG. 14, the magnetic head unit 8b comprises a magnetic core 25 formed of a magnetic material such as Mo-N-Fe alloy, Al-Si-Fe alloy, Ni-Zn ferrite or amorphous alloy, and a slider 26 formed of a non-magnetic material, such as barium titanate, for holding the magnetic core 25. An air-vent grove 27 is defined in the upper surface of the slider 26 facing the magnetic disk 2 to extend thoroughly, and a mirror 28 is integrally attached to almost a central position of the groove 27.

Figure 15:
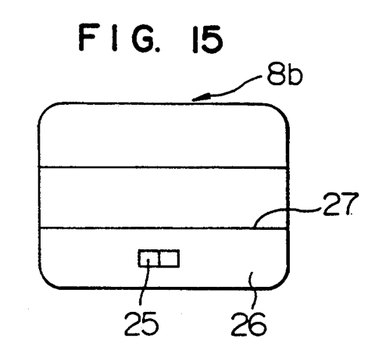
FIG. 15 is a bottom view showing a modification of the second magnetic head unit according to the second embodiment.

FIG. 15 is a bottom view showing a modification of the second magnetic head unit 8b according to the second embodiment. In this modification, the slider 26 is formed of such a material, e.g., barium titanate, as being white and having good reflectance.

Figure 16:
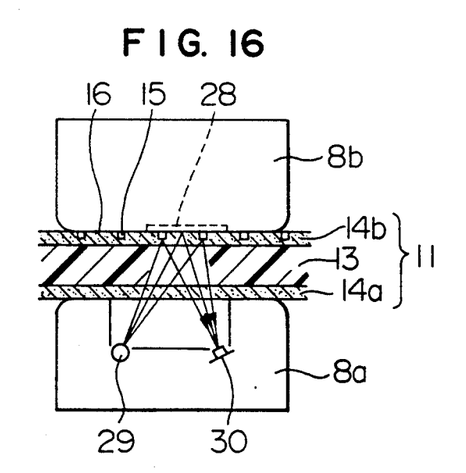
FIG. 16 is a view for explaining tracking servocontrol of a magnetic head according to the second embodiment.
Figure 17:
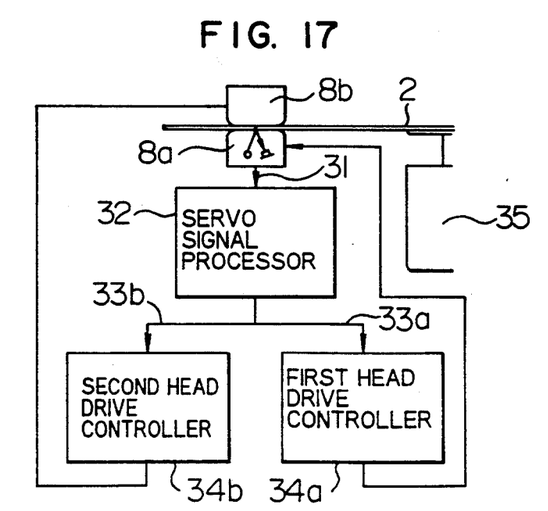
FIG. 17 is a block diagram for explaining tracking servocontrol of the magnetic head according to the second embodiment.

FIGS. 16 and 17 are views for explaining tracking servocontrol of the magnetic disk 2 according to the second embodiment. As shown in these drawings, the light emitting element 29 comprising an LED, for example, which emits a light beam for tracking servocontrol and the light receiving element 30 for receiving the reflected light from the magnetic disk 2 are both integrally attached to a first magnetic head unit 8a located to face the first magnetic layer 14a of the magnetic disk 2. Note that, as shown in FIG. 16, the light receiving element 30 is constituted to separately receive respective beams of the reflected light from the recording track portion and the recesses for tracking servocontrol on both sides of the former. Also, the portion of the first magnetic head 8a to which the light emitting element 29 and the light receiving element 30 are attached is made open toward the magnetic disk 2.

Then, as shown in FIG. 16, the mirror 28 attached to the second magnetic head unit 8b, or the flat portion of the slider 26 with high reflectance is arranged at a position suitable to reflect the light from the light emitting element 29.

The light from the light emitting element 29 passes through the first magnetic layer 14a having the flat surface and the base film 13, and is then reflected by the bottom portions of the recesses 15 and the recording track portion 16 of the second magnetic layer 14b. Because the mirror 28 or the flat portion of the slider 26 with high reflectance is always present in the vicinity of those reflecting portions, the light will not simply pass therethrough unlike the prior art, but can be positively reflected with high efficiency.

The reflected light passes through the base film 13 and the first magnetic layer 14a again, though reversely, and is then received by the light receiving element 30 (in fact, comprising a plurality of detection elements) attached to the first magnetic head unit 8a. Because the surface condition of the first magnetic layer 14a is totally flat as mentioned above, the tracking servocontrol will not be adversely affected upon the light passing through the first magnetic layer 14a.

Respective detection signals 31 from the light receiving element 30 are input to a servo signal processing section 32, as a shown in FIG. 17, in which the amount of shift of the magnetic head unit 8a (8b) relative to the recording track portion 16, i.e., the amount of position correction of the magnetic head unit 8a (8b) relative to the recording track portion 16, at the present time is calculated through arithmetic processing.

When the first magnetic head unit 8a, for instance, is now being used to perform any of write, read and erase of information, a position correction control signal 33a obtained from the servo signal processing section 32 is input to a first head drive controller 34a and the tracking servocontrol of the first magnetic head unit 8a is carried out in response to the control signal 33a.

On the other hand, when the second magnetic head unit 8b is now being used to perform any of write, read and erase of information, a position correction control signal 33b obtained from the servo signal processing section 32 is input to a second head drive controller 34b and the tracking servocontrol of the second magnetic head unit 8b is carried out in response to the control signal 33b. Incidentally, reference numeral 35 in FIG. 15 denotes a drive motor for driving the magnetic disk 2 to rotate.

While the light emitting element, the light receiving element, the mirror, etc. are arranged almost at the centers of the magnetic head units in this embodiment, the present invention is not limited to such an arrangement and those components may be integrally attached to the outer peripheral portions of the magnetic head units, for example, on the upstream side in the direction of rotation of the magnetic disk.

The results of various studies which have been conducted on a thickness of the magnetic layer and the ratio of the magnetic layer's thickness to the recess depth by using the magnetic head units of the first embodiment will be described below.

First, the relationship between a magnetic layer's thickness and an overwrite characteristic will be explained. Various 2MB magnetic disks with their magnetic layers being different in thickness from one another were fabricated by using the magnetic coating material given above as Composition Examples 2 of Magnetic Coating Material, and the overwrite characteristic of each magnetic disk was measured.

The overwrite characteristic was tested under conditions of first writing a predetermined signal on the magnetic disk with linear recording density of 8.5 kfci, then writing the signal with doubled linear recording density of 17 kfci, and evaluating the ratio of a level of the first written signal left not erased to a level of the second written signal. The evaluation results were tabulated as follows.

| Thickness of Magnetic Layer (μm) | Overwrite Characteristic (dB) |
|---|---|
| 2.8 | −25 |
| 1.0 | −35 |
| 0.7 | −40 |
| 0.5 | −45 |
| 0.3 | −48 |

As will be from the above table, when the magnetic layer is as thick as 2.5 μm like the prior art, the overwrite characteristic is over −30 dB, resulting in the problem of noise.

In contrast, when the thickness of the magnetic layer is less than 1 μm, the overwrite characteristic becomes below −30 dB. Particularly, when the thickness of the magnetic layer is less than 0.7 μm, characteristic becomes so very satisfactory that the magnetic disk with high reliability can be provided. For the above reason, the thickness of the magnetic layer is preferably restricted to be less than 1 μm.

Next, the ratio of the magnetic layer's thickness to the recess depth will be explained. The thickness of the magnetic layer was set to 1 μm in view of the above evaluation results of the overwrite characteristic, and the intensity ratio of the received light from the recess during the tracking servocontrol were measured while making the recess variously changed in depth, but unchanged in shape. The measurement results are tabulated below.

Note that the proportion of the recess depth in the table represents a percentage of the recess depth relative to the thickness of the magnetic layer (1 μm). Also, the intensity ratio of the received light from the recess represents a percentage of the intensity of the received light due to reflection by the recess on the assumption that the intensity of the received light due to reflection by the recording track portion free from any recesses is supposed to be 100.

| Depth of Recee (μm) | Proportion of Recess Depth (%) | Intensity Ratio of Received Light from Recess |
|---|---|---|
| 0.00 | 0 | 100 |
| 0.05 | 5 | 65 |
| 0.10 | 10 | 42 |
| 0.15 | 15 | 34 |
| 0.20 | 20 | 30 |
| 0.30 | 30 | 29 |

As will be seen from the above table, when the percentage of the recess depth relative to the thickness of the magnetic layer is on the order of 1%, there occurs a not so significant difference between the intensity of the received light due to reflection by the recess and that by the recording track portion free from any recesses, even if reflection means is provided on the rear side of the second magnetic layer as mentioned above. In other words, the effect resulted from forming the recesses will not appear distinctly, which leads to a problem in reliability of the tracking servocontrol.

On the contrary, when the percentage of the recess depth relative to the thickness of the magnetic layer is not less than 10%, preferably not less than 15%, more preferably not less than 20%, there occurs a significant difference between the intensity of the received light due to reflection by the recess and that by the recording track portion free from any recesses with the aid of providing reflection means on the rear side of the second magnetic layer as mentioned above. This makes it possible to perform the tracking servocontrol in a proper manner and improve the reliability.

Additionally, it is preferable that the percentage of the recess depth relative to the thickness of the magnetic layer is as large as possible over 10%, because the difference between the intensity of the received light due to reflection by the recess and that by the recording track portion free from any recesses appears more distinctly. However, where the method of forming the recesses through compression effected by a stamper is adopted as with this embodiment of the present invention, the percentage of the recess depth relative to the thickness of the magnetic layer has a limit at 70% in a practical sense.

Stated otherwise, although the percentage of the recess depth relative to the thickness of the magnetic layer could be as high as 80% or 90%, for instance, achievement of such percentage requires the pressure of a stamper to be increased up to an extremely high level. Also, if the stamper is repeatedly used under pressure at such an extremely high level, the projections of the stamper for forming the recesses would be worn so quickly and severely that the service life of the stamper is shortened and the recess shapes are changed due to wear of the recesses, with the result of that the recesses which have a distinctly recessed configuration can no longer be formed.

For the above reason, the percentage of the recess depth relative to the thickness of the magnetic layer preferably has an upper limit of 70%. In the present invention, therefore, the percentage of the recess depth relative to the thickness of the magnetic layer is restricted to be in a range of 10-70%.

Suitable examples in combination of the thickness of the magnetic layer and the corresponding recess depth are as follows.

| Thickness of Magnetic Layer ($\mu$m) | Depth of Recee ($\mu$m) | Proportion of Recess Depth (%) |
|---|---|---|
| 1.0 | 0.07 | 7 |
| 0.7 | 0.05 | 7 |
| 0.5 | 0.03 | 6 |

According to the present invention, as set forth above, by restricting the film thickness of the magnetic layer to be not greater than 1 $\mu$m, it is possible to improve an overwrite characteristic of a magnetic disk and thus obtain a magnetic disk undergoing less noise.

Further, by providing the light receiving element near the outer surface of the second magnetic layer, proper tracking servocontrol can be realized with the improved reliability using the light that has passed through the magnetic disk.

The present invention being thus described, it will be obvious that the same way may be varied in many ways. Such variations are not to be regarded as a departure from the spirit and scope of the invention, and al such modifications as would be obvious to one skilled in the art are intended to be included within the scope of the following claims.

What is claimed is:

1. A magnetic recording/reproducing apparatus comprising:
    drive means for rotatably driving a flexible magnetic disk loaded thereon, said flexible magnetic disk being comprised of a transparent and flexible base film provided with first and second magnetic layers respectively on opposite sides of said base film, each of said first and second magnetic layers having a thickness of not greater than 1 $\mu$m, said first magnetic layer having a flat surface, and said second magnetic layer, on that side away from said first magnetic layer, having an outer surface provided with recesses for tracing servocontrol, said recesses extending in a direction of rotation of said magnetic disk;
    a light emitting element for tracking servocontrol arranged on that side of said magnetic disk juxtapositioned to said first magnetic layer; and
    a light receiving element for receiving a light beam for tracking servocontrol, said light beam having passed through at least said first magnetic layer, said base film and said second magnetic layer, after being emitted from said light emitting element.

2. A magnetic recording/reproducing apparatus according to claim 1, wherein said light receiving element is arranged on that side of said magnetic disk juxtapositioned to said second magnetic layer.

3. A magnetic recording/reproducing apparatus according to claim 2, wherein said light emitting element for tracking servocontrol is provided integrally with a first magnetic head unit adapted to perform write/read of information on said first magnetic layer; and
    said light receiving element is provided integrally with a second magnetic head unit adapted to perform write/read of information on said second magnetic layer;
    said flexible magnetic disk being rotatably held between said first magnetic head unit and said second magnetic head unit.

4. A magnetic recording/reproducing apparatus according to claim 2, wherein said magnetic layer is formed as a coating composition comprising magnetic powder and a binder, said recesses being formed by partly compressing said coating composition of said second magnetic layer.

5. A magnetic recording/reproducing apparatus according to claim 1, wherein said recesses formed in said second magnetic layer each have an inverted-trapezoidal shape in cross-section.

6. A magnetic recording/reproducing apparatus according to claim 1, wherein a reflection means for reflecting said light beam having passed through said second magnetic layer is provided on said side of said magnetic disk juxtapositioned to said second magnetic layer, and a light receiving element for receiving said light beam reflected by said reflection means is arranged on said side of said magnetic disk juxtapositioned to said first magnetic layer.

7. A magnetic recording/reproducing apparatus according to claim 6, wherein said reflection means is provided by a surface of a slider of said second magnetic head unit adapted to perform write/read of information on said second magnetic layer.

8. A magnetic recording/reproducing apparatus according to claim 6, wherein said reflection means is provided by a mirror integral with said second magnetic head unit adapted to perform write/read of information on said second magnetic layer.

9. A magnetic recording/reproducing method comprising the steps of:
   providing a flexible magnetic disk;
   loading said flexible magnetic disk on a drive means of a recording/reproducing apparatus, said magnetic disk being comprised of a transparent and flexible base film provided with first and second magnetic layer respectively on opposite sides of said base film, each or said first and second magnetic layers having a film thickness of not greater than 1 $\mu$m, said first magnetic layer having a flat surface, and said second magnetic layer, on that side away from said first magnetic layer, having an outer surface provided with recesses for tracking servocontrol, said recesses extending in a direction of rotation of said magnetic disk;
   arranging a light emitting element for tracing servocontrol on that side of said magnetic disk juxtapositioned to said first magnetic layer;
   arranging a light receiving element on that side of said magnetic disk juxtapositioned to said second magnetic layer; and
   causing said light receiving element to receive a light beam passed through said flexible magnetic disk after being emitted from said light emitting element, to thereby perform tracking servocontrol of a magnetic head unit.

10. A magnetic recording/reproducing method according to claim 9, wherein said light emitting element for tracking servocontrol is provided integrally with a first magnetic head unit adapted to perform write/read of information on said first magnetic layer; and
   said light receiving element for receiving said light beam for tracking servocontrol is provided integrally with a second magnetic head unit adapted to perform write/read of information on said second magnetic layer;
   said flexible magnetic disk being rotatably held between said first magnetic head unit and said second magnetic head unit.

* * * * *